(12) United States Patent
Ahn et al.

(10) Patent No.: US 8,048,524 B2
(45) Date of Patent: *Nov. 1, 2011

(54) POLYMER LATEX HAVING EXCELLENT IMPACT-RESISTANCE AND POWDER FLOW PROPERTY AND METHOD FOR PREPARING THE SAME

(75) Inventors: Jeong Heon Ahn, Jeollanam-do (KR); Byung Tae Yang, Jeollanam-do (KR); Chan Hong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 508 days.

This patent is subject to a terminal disclaimer.

(21) Appl. No.: 11/023,502

(22) Filed: Dec. 29, 2004

(65) Prior Publication Data

US 2005/0203247 A1    Sep. 15, 2005

(30) Foreign Application Priority Data

Dec. 30, 2003    (KR) .......................... 10-2003-0100081

(51) Int. Cl.
    *B32B 5/00*    (2006.01)
(52) U.S. Cl. ................ 428/402.2; 428/402; 428/402.21; 428/402.24; 264/4.1
(58) Field of Classification Search ...... 428/402–402.24; 427/213.3–213.36; 264/4–4.7
    See application file for complete search history.

(56) References Cited

U.S. PATENT DOCUMENTS

| | | | |
|---|---|---|---|
| 4,108,946 A | | 8/1978 | Kamada et al. |
| 4,278,546 A | | 7/1981 | Roesler |
| 4,278,576 A | | 7/1981 | Goldman |
| 4,352,910 A | * | 10/1982 | Katto et al. .................. 525/183 |
| 4,393,172 A | | 7/1983 | Lindner et al. |
| 5,541,256 A | * | 7/1996 | Takaki et al. .................. 525/82 |
| 6,214,910 B1 | * | 4/2001 | Agarwal ....................... 524/143 |

FOREIGN PATENT DOCUMENTS

| | | |
|---|---|---|
| EA | 1201701 A2 | 5/2002 |
| EP | 0985692 A2 | 3/2000 |
| EP | 0 953 583 B1 | 7/2005 |
| JP | 49-11982 | 2/1974 |
| JP | 50-23067 | 8/1975 |
| JP | 57-73036 A | 5/1982 |
| JP | 61-000211 A | 1/1986 |
| JP | 62-236850 A | 10/1987 |
| JP | 6-298878 A | 10/1994 |
| JP | 8-225622 A | 9/1996 |
| JP | 11-140140 A | 5/1999 |
| KP | 100380551 B | 4/2003 |
| KP | 1020060105149 A | 11/2006 |
| KR | 0160333 B1 | 5/1996 |
| KR | 1999-0060688 A | 7/1999 |
| KR | 10-2004-0062761 * | 7/2004 |
| KR | 10-2004-0062761 A | 7/2004 |

* cited by examiner

*Primary Examiner* — James J Seidleck
*Assistant Examiner* — Saira B Haider
(74) *Attorney, Agent, or Firm* — Birch, Stewart, Kolasch & Birch, LLP

(57) ABSTRACT

The present invention relates to a multilayer polymer latex comprising a seed, a rubbery core surrounding the seed, and a shell surrounding the rubbery core, in which the seed comprises a vinyl unit, a hydrophilic unit and a crosslinker unit, as well as a preparation method thereof. The present invention can provide an acrylic polymer latex and a diene polymer latex, depending on materials constituting the core and the shell. In the present invention, the seed containing a vinyl unit, a hydrophilic unit and a crosslinker unit, and the rubbery core, are used for the preparation of the polymer latex. This can increase the rubber content of the polymer latex, thus improving the impact resistance of the polymer latex, and at the same time, reduce the viscosity of the polymer latex so as to improve the long-term workability of the polymer latex upon spray drying. Thus, polymer powder prepared from the polymer latex is excellent in not only impact resistance but also flow properties.

18 Claims, No Drawings

POLYMER LATEX HAVING EXCELLENT IMPACT-RESISTANCE AND POWDER FLOW PROPERTY AND METHOD FOR PREPARING THE SAME

BACKGROUND OF THE INVENTION

1. Field of the Invention

The present invention relates to a polymer latex which can be prepared into powder having excellent impact resistance and flow properties, as well as a preparation method thereof. Furthermore, the present invention relates to polymer powder obtained by spray-drying the polymer latex, and a resin composition containing the polymer powder as an impact modifier.

2. Description of the Prior Art

Polymer resins or their mixtures are used to manufacture a variety of molded articles. However, such resins mostly show high brittleness only by themselves, and hence have no impact resistance required in final products. To overcome such a shortcoming, additives are generally used in the processing of thermoplastic resins. The most typical examples of the thermoplastic resins include polyvinyl chloride (PVC) resin. Generally, impact-resistance improvers or impact modifiers, such as methyl methacrylate-butadiene-styrene (MBS) resins, chlorinated polyethylene (CPE) resins or acrylic resins, are added to improve the impact resistance of PVC. Of such additives, the acrylic resins are particularly excellent in weather resistance, and so widely used as impact modifiers for exterior PVC products which are exposed to sunlight for relatively a long time.

The impact modifiers are generally supplied in the form of powders which mostly have a core-shell structure. Generally, the cores are made of a rubbery polymer with low glass transition temperature, and the shells are made of a polymer with a relatively high glass transition temperature. In this case, in order to increase the impact strength of the resins, it is preferable to increase the content of a rubbery polymer in the impact modifiers, thus increasing the impact resistance of the impact modifiers. However, if the content of the rubbery polymer in the impact modifiers is increased, the amount of the shell material in the structure of the impact modifiers will be decreased so that portions of the cores which are not surrounded by the shells will be large, resulting in an increase in the stickiness of the impact modifier particles. Accordingly, it will be difficult for conventional isolation methods to prepare powders with excellent flow properties from an emulsion having the impact modifier polymer particles dispersed therein.

Methods of obtaining impact modifiers in a powder form by isolating particles from an emulsion having the impact modifier polymer particles dispersed therein can be broadly into two categories. The first is to obtain powders by coagulation and drying, and the second is to obtain powders by spray drying.

In the case of the coagulation and drying, electrolytes, organic acids or inorganic acids are added to a prepared emulsion containing the impact modifiers so as to prepare coagulated slurry. The coagulated slurry is washed and filtered, followed by drying in a dryer, thus obtaining impact modifier powders.

In the case of the spray drying, an impact modifier-containing emulsion is sprayed in a drier containing hot air so as to evaporate moisture, thus obtaining impact modifier powders. Although the spray drying is a very economical and simple method to obtain the impact modifier powders, it is inconvenient in that the impact modifier particles can easily adhere to the wall surface of the spray dryer, and a sprayer should be frequently washed such that the sprayer outlet is not clogged by the sticking of the impact modifiers. This problem becomes severe, particularly when an emulsion containing impact modifiers with high rubber content is spray-dried.

In an attempt to solve this problem, U.S. Pat. No. 4,278,576 discloses a method of using stearate coated calcium carbonate as a flow improver in spray-drying the impact modifiers with high rubber content. Also, this patent discloses co-spray drying the impact modifier having a rubber content of 88%, with 7% by weight of the flow improver.

However, there is still no disclosure of an example of either an acrylic polymer latex having low viscosity together with a rubber content of more than 90 wt %, or a diene polymer latex with low viscosity together with a rubber content of more than 40 wt %, which can be prepared into powders with excellent long-term workability and flow properties.

SUMMARY OF THE INVENTION

The present inventors have first prepared a multilayer polymer latex comprising a seed-rubbery core-shell particle, using a seed containing a vinyl unit, a hydrophilic unit and a crosslinker unit, and also found that the rubber content and viscosity of the polymer latex can be controlled by adjusting the kinds and amounts of the seed units, and/or the kind of an emulsifier and a polymerization process in the preparation of the rubbery core.

The present invention provides a multilayer polymer latex comprising a seed, a rubbery core surrounding the seed, and a shell surrounding the rubbery core, in which the seed comprises a copolymer of a vinyl monomer and a hydrophilic monomer, the copolymer containing: i) 65-99.0 parts by weight of a vinyl unit, ii) 0.5-30 parts by weight of a hydrophilic unit, and iii) 0.5-5 parts by weight of a crosslinker unit, the parts by weight being based on the sum of the seed units taken as 100 parts by weight.

The present invention can provide an acrylic polymer latex or a diene polymer latex, depending on the materials of the core and shell of the polymer latex.

In one specific embodiment, the present invention provides an acrylic polymer latex comprising:

a) a seed comprising a copolymer of a vinyl monomer and a hydrophilic monomer, the copolymer containing: i) 65-99.9 parts by weight of a vinyl unit, ii) 0.5-30 parts by weight of a hydrophilic unit, and iii) 0.5-5 parts by weight of a crosslinker unit, the parts by weight being based on the sum of the seed units taken as 100 parts by weight;

b) a rubbery core surrounding the seed, which comprise: i) 97.0-99.9 parts by weight of alkyl acrylate where the alkyl group contains 1 to 8 carbon atoms, and ii) 0.1-3.0 parts by weight of a crosslinker unit, the parts by weight being based on the sum of the core units taken as 100 parts by weight; and c) a shell surrounding the rubbery core, which comprises at least one unit selected from an alkyl methacrylate unit where the alkyl group contains 1 to 4 carbon atoms, and an aromatic vinyl unit.

In the acrylic polymer latex, it is preferable that the seed should be present at an amount of 0.3-10 parts by weight, the rubbery core at 89.7-94.7 parts by weight, and the shell at 0.3-10 parts by weight, the parts by weight being based on the sum of the polymer latex units taken as 100 parts by weight.

In another embodiment, the present invention provides a diene polymer latex comprising:

a) a seed comprising a copolymer of a vinyl monomer and a hydrophilic monomer, the copolymer containing: i) 65-99.0 parts by weight of a vinyl unit, ii) 0.5-30 parts by weight of a hydrophilic unit, and iii) 0.5-5 parts by weight of a crosslinker unit, the parts by weight being based on the sum of the seed units taken as 100 parts by weight;

b) a rubbery core surrounding the seed, which comprises a diene unit; and c) a shell surrounding the rubbery core, which comprises at least one unit selected from the group consisting of an aromatic vinyl unit and an acrylate unit.

In the diene polymer latex, it is preferable that the seed should be present at an amount of 0.3-10 parts by weight, the rubbery core at 40-70 parts by weight, and the shell at 20-59.7 parts by weight, the parts by weight being based on the sum of the polymer latex units taken as 100 parts by weight.

Furthermore, the present invention provides a method for preparing a polymer latex, the method comprising the steps of:

a) emulsion-polymerizing an emulsion containing i) 65-99.0 parts by weight of a vinyl monomer, ii) 0.5-30 parts by weight of a hydrophilic monomer, and iii) 0.5-5 parts by weight of a crosslinker monomer, so as to prepare a seed latex, the parts by weight being based on the sum of the seed monomers taken as 100;

b) adding a rubbery core monomer to the seed latex of the step a) and emulsion-polymerizing the added core monomer, so as to form a rubbery core latex outside of the seed latex; and c) adding an emulsion containing a shell monomer to the rubbery core latex of the step b) and emulsion-graft-polymerizing the added shell monomer, so as to form a shell outside of the rubbery core.

In the above method, the emulsion in each step preferably contains an emulsifier.

In addition, the present invention provides polymer powder obtained by spray-drying the polymer latex, as well as a resin composition containing the polymer powder.

DETAILED DESCRIPTION OF THE PREFERRED EMBODIMENTS

Hereinafter, the present invention will be described in detail.

Seed

In order to increase the rubber content of the polymer latex while reducing the viscosity of the polymer latex, the present invention is characterized by using a seed containing a vinyl unit, a hydrophilic unit and a crosslinker unit, in preparing a multilayer polymer latex comprising: a) a seed, b) a rubbery core surrounding the seed, and c) a shell surrounding the rubbery core.

The seed a) comprises a copolymer of a vinyl monomer and a hydrophilic monomer, which can be prepared by emulsion-polymerizing an emulsion containing a vinyl monomer, a hydrophilic monomer, a crosslinker monomer, and if necessary, an emulsifier.

In one embodiment, the seed may comprise a copolymer of a vinyl monomer and a hydrophilic monomer, which contains: i) 65-99.0 parts by weight of a vinyl unit, ii) 0.5-30 parts by weight of a hydrophilic unit, and iii) 0.5-5 parts by weight of a crosslinker unit, the parts by weight being based on the sum of the seed units taken as 100 parts by weight.

In another embodiment, the seed latex may be prepared by emulsion-polymerizing an emulsion containing: i) 65-99.0 parts by weight of a vinyl monomer, ii) 0.5-30 parts by weight of a hydrophilic monomer, and iii) 0.5-5 parts by weight of a crosslinker monomer, the parts by weight being based on the sum of the seed units taken as 100 parts by weight.

If necessary, an emulsifier may be added to the emulsion at an amount of 0.001-5 parts by weight based on the sum of the seed monomer taken as 100 parts by weight.

The emulsifier may be the same as one able to be used in the preparation of the rubbery core latex.

In the preparation of the seed latex, a conventional polymerization initiator or electrolyte may also be used.

According to the present invention, the composition ratios of the vinyl unit, the hydrophilic unit and the crosslinker unit in the seed of the polymer latex are controlled in the above-described range, such that a polymer latex having high rubber content together with low viscosity can be provided. For example, the present invention can provide either an acrylic polymer latex having a rubber content of more than 90% by weight together with a viscosity of less than 1000 cps, or a diene polymer latex with a rubber content of more than 40% together with a viscosity of less than 1000 cps. The above-described composition ratios resulted from our steady experiments.

If the composition range of each material of the seed is out of the composition range described in the above embodiment, an increase in the rubber content in the subsequent preparation of the rubbery core will be caused, thus making the impact resistance of the polymer latex excellent. However, in this case, the particles of the polymer latex can adhere to the wall surface of a dryer upon spray drying, or the sticking of the latex particles to the outlet of a spray can become severe. Accordingly, a polymer latex having excellent long-term workability and a polymer powder having excellent flow properties cannot be obtained.

This is because, in the preparation of the seed latex, the crosslinking degree, polarity, glass transition temperature and particle size of the seed latex particle may be adjusted depending on the kinds and composition ratios of the vinyl monomer, the hydrophilic monomer and the crosslinker monomer, and the seed adjusted as such may influence the fundamental physical properties of the polymer latex and the polymer powder prepared therefrom.

Meanwhile, factors influencing the viscosity of the polymer latex include total solid content (TSC), particle size and distribution, core-to-shell ratio, etc. Thus, it is preferable to adjust such factors so as to reduce the viscosity of the final polymer latex to the lowest possible extent.

The glass transition temperature of a seed particle to be obtained by the use of the above-described composition ratio is in a range of −45° C. to 25° C.

The seed latex is advantageously prepared in a particle size of 50-300 nm in view of polymerization and graft in subsequent steps. This will also maximize the impact resistance of the polymer latex. Particularly, monodispersity of the particle size of the prepared seed latex is important. Also, since the crosslinking degree of this seed influences the overall morphology of the impact modifier, the toluene-insoluble fraction of the seed particle of the impact modifier is preferably 50-99.9% by weight such that the seed has a suitable crosslinking degree.

In the present invention, unlike the prior art, the hydrophilic unit with a higher polarity than that of a lipophilic monomer is added upon the preparation of the seed latex in the above-described composition range. This can adjust the particle size and graft ratio of the polymer latex thus reducing the viscosity of the polymer latex. This is because if the hydrophilic unit is added, the polarity, glass transition temperature and polymerization reactivity of the seed particles will be increased, so that a possibility for fresh particles to occur during reaction can be lowered so as to make the particle size of the polymer latex uniform. And if the particle size becomes uniform, the surface areas of the particles will be reduced so that the graft ratio of the shell will also be increased.

Examples of hydrophilic monomers which can be used in the present invention include, but are not limited to, polar hydrophilic monomers with a higher glass transition temperature than room temperature, for example, acrylonitrile, alkyl methacrylate, such as methyl methacrylate, benzyl methacrylate, etc., and polar hydrophilic monomers with a lower glass transition temperature than room temperature, for example, alkyl acrylate, such as methyl acrylate, ethyl acrylate, butyl acrylate, and 2-ethylhexyl acrylate, etc. By selecting a suitable hydrophilic monomer from such hydrophilic monomers, the polarity and glass transition temperature of the seed latex particle can be adjusted. This can prepare either an acrylic polymer latex with low viscosity together with a rubber content of more than 90% by weight, or a diene polymer latex with low density together with more than 40% by weight.

In addition, examples of hydrophilic monomers which can be used in the present invention include monomers containing functional groups, such as hydroxyl, carboxyl or epoxy groups, for example, hydroxyl methyl methacrylate, glycidyl methacrylate, etc.

Examples of vinyl monomers which can be used in the present invention include, but are not limited to, non-polar vinyl monomers with a higher glass transition temperature than room temperature, for example, styrene, α-methylstyrene, vinyl toluene, 3,4-dichlorostyrene, etc.

Examples of crosslinker monomers which can be used in the present invention, but are not limited to, divinylbenzene, 1,3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethyleneglycol diacrylate, and tetraethyleneglycol dimethacrylate. Particularly, to efficiently increase the crosslinking degree of the vinyl monomer, divinylbenzene is preferably used.

Rubbery Core

Then, the rubbery core latex may be prepared by adding an emulsion containing a rubbery core monomer and if necessary, an emulsifier, to the seed prepared as described above, and then emulsion-polymerizing the added core monomer.

For the acrylic polymer latex, the rubbery core may comprise: i) 97.0-99.9 parts by weight of alkyl acrylate where the alkyl group contains 1-8 carbon atoms, and ii) 0.1-3.0 parts by weight of a crosslinker unit, the parts by weight being based on the sum of the core units taken as 100 parts by weight.

For the diene polymer latex, the rubbery core may comprise a diene unit.

As described above, if an impact modifier with high rubber content is used, there will be an advantage in that the amount of use of the impact modifier required in resin, particularly vinyl chloride resin, is reduced due to their excellent impact resistance. However, generally, if the rubber content in the impact modifier exceeds the specified range, the graft ratio of the shell will be reduced so as to make it impossible to completely surround the rubbery core, and thus a stickiness will be increased resulting in an increase in the viscosity of the polymer latex and a reduction in the mechanical stability of the polymer latex.

However, according to the present invention as described above, the viscosity of the polymer latex can be controlled at a low level by adjusting the kinds and component ratios of materials in the preparation of the seed latex so as to suitably adjust the polarity and glass transition temperature of the seed latex. Moreover, the viscosity of the polymer latex may also be additionally controlled at a low level by suitably adjusting the kind and composition of the emulsifier and a polymerization process in the preparation of the rubbery core latex so as to adjust the polarity, glass transition temperature, particle size and graft ratio of the polymer latex particles. If the viscosity of the polymer latex is decreased, the polymer latex can be prepared into polymer powder which is excellent in mechanical stability, long-term workability upon spray drying, and flow properties.

Examples of emulsifiers which can be used in the present invention include, but are not limited to, adsorption-type emulsifiers which are removed by washing, for example, potassium salts of unsaturated fatty acids, potassium salts of oleic acids, sodium lauryl sulfate (SLS), sodium dodecyl benzene sulfonate (SDBS), sodium dodecyl alkyl sulfosuccinate (DOSS), and reaction-type emulsifiers which are reacted with the units so as not to be removed by washing, for example, ionic emulsifiers such as dipotassium alkenyl succinate (ASK), dodecyl sulfopropyl maleate (M12), tetradecyl sulfopropyl maleate (M14), polyoxyethylene nonyl(o-propenyl)phenyl ether ammonium sulfate (BC-10), or polyoxyethylene nonyl(o-propenyl)phenyl ether sodium carboxylate (H3626 A), and non-ionic emulsifiers, such as polyoxyethylene nonyl(o-propenyl)phenyl ether (RN-10). Among them, preferred are ionic emulsifiers, such as dipotassium alkenyl succinate (ASK), dodecyl sulfopropyl maleate (M12), tetradecyl sulfopropyl maleate (M14), polyoxyethylene nonyl(o-propenyl)phenyl ether ammonium sulfate (BC-10), or polyoxyethylene nonyl(o-propenyl)phenyl ether sodium carboxylate (H3626 A), and polyoxyethylene nonyl(o-propenyl) phenyl ether (RN-10). Such emulsifiers adjust the polarity of the rubbery core by reaction with the units, and may also adjust the glass transition temperature of the rubbery core depending on their glass transition temperature. Moreover, such emulsifiers are used at a smaller amount than the adsorption-type emulsifiers so that they can inhibit the formation of fresh particles and make the size of particles uniform. In addition, if the particle size becomes uniform, the graft ratio of the polymer latex can also be increased so as to control the viscosity of the polymer latex.

The emulsifier is preferably added at an amount of 0.01-5 parts by weight based on the sum of the rubbery core monomers taken as 100 parts by weight.

In the emulsion polymerization, a conventional polymerization initiator may also be used.

The glass transition temperature (Tg) of the rubbery core prepared as such is preferably less than 25° C., preferably less than 0° C., and more preferably less than −40° C., in order to maintain the elasticity of the rubbery core which may influence the impact strength of the polymer latex.

Examples of alkyl acrylate which can be used in the present invention include, but are not limited to, methyl acrylate, ethyl acrylate, propyl acrylate, isopropyl acrylate, butyl acrylate, hexyl acrylate, octyl acrylate, and 2-ethylhexyl acrylate. Particularly preferred are ethyl acrylate, 2-ethylhexyl acrylate, butyl acrylate and mixtures thereof.

The crosslinker monomer in the components of the rubbery core may be the same as one able to be used in the preparation of the seed latex. Preferred examples of the crosslinker monomer include 1,3-butanediol diacrylate, 1,3-butanediol dimethacrylate, allyl acrylate, allyl methacrylate, and mixtures thereof.

The crosslinker monomer is preferably used in an amount of 0.1-3.0 parts by weight based on the sum of the core monomers taken as 100 parts by weight. If the content of the crosslinker monomer is less than 0.1 part by weight, a spherical particle can be easily deformed, and if it is more than 3.0 parts by weight, the impact modifier will show brittle property, resulting in the deterioration in the impact modification effect of the polymer.

Examples of diene monomers which can be used in the present invention include, but are not limited to, 1,3-butadiene, isoprene, etc.

Shell

The shell c) surrounding the rubbery core can be formed by emulsion-graft-polymerizing an emulsion containing a shell monomer and if necessary, an emulsifier, to the rubbery core latex prepared as described above.

The emulsion graft polymerization of the shell is to graft a monomer compatible with a resin requiring impact modification, to the surface of the rubbery core, such that it surrounds the rubbery core.

In the formation of the shell, an emulsifier is preferably added to the emulsion in an amount of 0.001-0.5 parts by weight based on the sum of the shell monomers taken as 100 parts by weight. Moreover, a conventional polymerization initiator may also be used in the emulsion graft polymerization.

For the acrylic polymer latex, examples of shell units which can be used in the present invention include alkyl methacrylate where the alkyl group contains 1-4 carbon atoms, and styrene, an aromatic unit, etc. Specific Examples of the alkyl methacrylate include methyl methacrylate, ethyl methacrylate, butyl methacrylate, etc. In this case, in order to adjust the glass transition temperature of the shell component, methacrylic acid, acrylic acid, or alkyl acrylate such as methyl acrylate, ethyl acrylate or butyl acrylate, may also be used as a comonomer. Also, in order to further increase the compatibility of the shell component with a matrix resin, a nitrile component such as acrylonitrile or methacrylonitrile may be used as a comonomer. At least one comonomer selected from the above comonomers may preferably be used in an amount of 0.1-20 parts by weight based on 100 parts by weight of the shell monomer.

For the diene polymer latex, examples of shell monomers which can be used in the present invention include aromatic vinyl monomers, acrylate monomers, etc. Specific examples thereof include styrene, acrylonitrile, α-methylstyrene, methyl methacrylate, ethyl acrylate, butyl acrylate, methacrylic acid, acrylic acid and the like. Such monomers may be used alone or a mixture of two or three thereof.

However, the shell monomer is not limited to the above-listed monomers, and the kind and composition of the shell monomer may vary depending on the composition and components of a resin to be impact-modified.

An emulsifier which can be used in the formation of the shell may be the emulsifier used in the preparation of the rubbery core latex.

Polymer Latex

If the inventive polymer latex is the acrylic polymer latex, it will preferably comprise: a) 0.3-10 parts by weight of the seed, b) 89.7-94.7 parts by weight of the rubbery core, and 0.3-10 parts by weight of the shell, the parts by weight being based on the sum of the polymer latex units taken as 100 parts by weight.

If the inventive polymer latex is the diene polymer latex, it will preferably comprise: a) 0.3-10 parts by weight of the seed, b) 40-70 parts by weight of the rubbery core, and c) 20-59.7 parts by weight of the shell, the parts by weight being based on the sum of the polymer latex units taken as 100 parts by weight.

To isolate impact modifier particles by spray drying, it is preferable that the viscosity of the final polymer latex should not exceed 1000 cps. If the latex viscosity exceeds 1000 cps, the particles will adhere to the wall surface of a spray dryer, or the sticking of the polymer latex to the sprayer will become severe.

The average particle diameter of the inventive polymer latex prepared as described above is more than 200 nm, preferably 200-1000 nm, and more preferably 200-700 nm.

Polymer Powder

The polymer latex can be spray-dried so as to prepare polymer powder. By this method, an acrylic impact modifier and a diene impact modifier may be prepared. The inventive polymer powder is preferably added to a resin composition in an amount of 1-20% by weight.

The spray drying may be performed by a conventional method.

The acrylic impact modifier powder preferably shows the flow properties of powder-type impact modifiers, including a bulk density of more than 0.45 (g/cc), a compressibility of less than 18%, and a funnel flow time shorter than 20 seconds, at which the free flow of powder is possible.

If the acrylic impact modifier powder as described above is added to PVC resin, it can impart excellent impact resistance and weather resistance to the matrix PVC resin. Particularly, this impact modifier powder will be very useful in the preparation of products using the vinyl chloride resin and requiring all impact resistance and weather resistance, such as PVC sidings, PVC window profiles, and the like. Also, the acrylic impact modifier of the present invention added to the vinyl chloride resin is preferably added in an amount of 1-20 parts by weight relative to 80-99 parts by weight of the vinyl chloride resin in view of processibility, impact resistance and economical factors.

DETAILED DESCRIPTION OF THE PREFERRED EMBODIMENTS

Hereinafter, the present invention will be described in detail by the following examples and comparative examples. It is to be understood, however, that these examples are given for illustrative purpose only and are not construed to limit the scope of the present invention.

Example 1

Preparation of Seed Latex

Into a four-neck flask reactor equipped with an agitator, a thermometer, a nitrogen inlet and a flux condenser, 123.2 g of deionized water (DI water), 4.6 g of fatty acid potassium salt and 2.7 g of potassium sulfate (3% solution) were added.

Under a nitrogen atmosphere, the temperature within the reactor was elevated to 75° C. As the reactor temperature reached 75° C., an emulsion containing 5.7 g of styrene (ST), 0.6 g of acrylonitrile (AN) and 0.08 g of ethyleneglycol dimethacrylate (EGDMA) was added at the same time, and polymerized for 3 hours with stirring, so as to prepare a styrene-acrylonitrile copolymer seed latex.

The prepared seed had a acrylonitrile content of 10% by weight, a polymerization conversion of 99%, an average particle diameter of 90 nm, a total solid content of 5% by weight, and a toluene-insoluble fraction of 70% by weight.

The toluene-insoluble fraction value was obtained by precipitating the seed latex in methanol, drying the precipitate, swelling the dried powder in toluene for 24 hours at room temperature, centrifuging the solution at 0° C. and 12,000 rpm for 60 minutes to collect a toluene-insoluble fraction, drying it in a hot air dryer and then expressing the dried fraction as a weight percentage based on the seed latex.

(Formation of Acrylic Rubbery Core)

To the seed latex prepared as described above, 23.3 g of deionized water, 0.4 g of Trem LF-40 (8% solution), 45.5 g of formaldehyde sodium sulfoxylate (SFS, 3.53% solution), 10.7 g of disodium ethylenediaminetetraacetate (EDTA, 3% solution) and 2.7 g of iron sulfate (3% solution) were added, and the reactor temperature was adjusted to 53° C.

To form a butyl acrylate-based rubbery core, a monomer pre-emulsion containing 317.6 g of deionized water (DI water), 748.0 g of butyl acrylate (BA), 4.0 g of allyl methacrylate (AMA), 1.6 g of ethyleneglycol dimethacrylate (EGDMA), 188 g of Trem LF-40 (8% solution) and 1.8 g of cumene hydroperoxide (CHP, 80%) was divided into three equal parts and added to the seed latex in one-hour intervals at the same time, followed by polymerization. Here, the rubbery core monomers were added in such a manner as that the sum of the seed and the rubbery core monomers was 95% by weight based on the total weight of the impact modifier. After completion of the addition of the monomer pre-emulsion, it was left to stand at 60° C. for one hour, thus completing the core section.

(Formation of Shell)

For shell polymerization, a shell pre-emulsion containing 32.0 g of ion-exchanged water, 40.0 g of methyl methacrylate and 10.0 g of Trem LF-40 (8% solution) was prepared. The temperature of the reactor was elevated to 70° C., and to the prepared rubbery core latex in the reactor, the shell emulsion and 9.34 g of potassium persulfate (3% solution) were added at the same time and polymerized. After reaching peak, the reaction mixture was left to stand at 70° C. for one hour, thus completing the polymerization. The resulting polymer latex had a particle size of 450 nm and a total solid content of 45% by weight.

(Preparation of Powder from Polymer Latex)

The polymer latex prepared as described above was spray-dried to obtain polymer powder. For this purpose, sodium lauryl sulfate (SLS) was added to the polymer latex at an amount of 2-3% by weight based on the solid content of the latex, and the mixture was transported by a pump into a sprayer rotating at 10,000 rpm while maintaining the solid content in the polymer latex at 45%. The sprayer input and exit temperatures of the polymer latex were set to 180° C. and 70° C., respectively, and the moisture of the polymer latex was evaporated in an instant. The dried powder was collected by a cyclone. In order to further increase the flow properties of the polymer powder, less than 2% by weight, based on the polymer powder, of $CaCO_3$ was added.

To examine the properties of the prepared polymer powder, it was tested for bulk density, compressibility, flowabiliy and discoloration.

The bulk density was expressed as g/cc by dividing the weight (g) of the polymer powder in a 100-cc cup by 100.

The compressibility of the impact modifier powder was measured by putting 30 g of the impact modifier powder in a cup, tapping it with a 3.5-kg weight, vibrating it on a 18-mesh screen for 100 seconds, and calculating the weight ratio (%) of masses remaining on the screen to the initial weight of the impact modifier powder.

The flowabiliy of the impact modifier powder was measured by a funnel flow test according to ASTM D-1895.

The discoloration of the polymer powder was examined by exposing 3 g of the impact modifier powder to a temperature 190° C. for 30 minutes and then measuring the yellow index (YI) of the exposed powder.

Example 2

Polymer latex was prepared and an acrylic impact modifier powder was prepared from the polymer latex, in the same manner as in Example 1 except that, in the preparation of the seed latex, styrene and acrylonitrile were used in amounts of 5.06 g and 1.2 g, respectively. The prepared seed latex had a total solid content of 5% by weight, an average particle diameter of 90 nm, an acrylonitrile content in copolymer of 20% by weight, and a toluene-insoluble fraction of 72% by weight.

Example 3

Polymer latex was prepared and an acrylic impact modifier powder was prepared from the polymer latex, in the same manner as in Example 1 except that, in the preparation of the core latex, dipotassium alkenylsuccinate (ASK) was used in place of Trem LF-40.

Example 4

Polymer latex was prepared and an acrylic impact modifier powder was prepared from the polymer latex, in the same manner as in Example 1 except that, in the preparation of the core latex, polyoxyethylene nonyl(o-propenyl)phenyl ether ammonium sulfate (BC-10) was used in place of Trem LF-40.

Example 5

Polymer latex was prepared and an acrylic impact modifier powder was prepared from the polymer latex, in the same manner as in Example 1 except that, in the preparation of the core latex, polyoxyethylene nonyl(o-propenyl)phenyl ether sodium carboxylate (H3626 A) was used in place of Trem LF-40.

Example 6

Polymer latex was prepared and an acrylic impact modifier powder was prepared from the polymer latex, in the same manner as in Example 1 except that, in the preparation of the core latex, polydodecyl sulfopropyl maleate (M12) was used in place of Trem LF-40.

Example 7

Polymer latex was prepared and an acrylic impact modifier powder was prepared from the polymer latex, in the same manner as in Example 1 except that, in the preparation of the core latex, tetradecyl sulfopropyl maleate (M14) was used in place of Trem LF-40.

Example 8

Polymer latex was prepared and an acrylic impact modifier powder was prepared from the polymer latex, in the same manner as in Example 1 except that in the preparation of the core latex, sodium lauryl sulfate (SLS) was used in place of Trem LF-40.

Examples 9 and 10

In Examples 9 and 10, polymer latexes were prepared and acrylic impact modifier powders was prepared from such polymer latexes, in the same manner as in Examples 1 and 2, respectively, except that, in the preparation of the seed latex, butyl acrylate (BA) was used in place of acrylonitrile. The prepared seed latexes had a total solid content of 5% by weight and an average particle diameter of 90 nm. Also, the latexes had butyl acrylate contents of 10% by weight and 20% by weight in copolymers, respectively, and toluene-insoluble fractions of 81% by weight and 78% by weight, respectively.

Comparative Example 1

An acrylic impact modifier powder was prepared in the same manner as in Example 1 except that, in the preparation of the seed latex, acrylonitrile was not used and 6.34 g of styrene was used to prepare a styrene homopolymer. The prepared seed latex had a total solid content of 5% by weight, an average particle diameter of 90 nm, and a toluene-insoluble fraction of 59% by weight.

Comparative Example 2

An acrylic impact modifier powder was prepared in the same manner as in Example 1 except that, in the preparation of the seed latex, styrene and acrylonitrile were not used and 6.34 g of methyl methacrylate (MMA) was used to prepare a methyl methacrylate homopolymer. The prepared seed latex had a total solid content of 5% by weight, an average particle diameter of 90 nm, and a toluene-insoluble fraction of 66% by weight.

Comparative Example 3

An acrylic impact modifier powder was prepared in the same manner as in Example 1 except that, in the preparation of the seed latex, styrene and acrylonitrile were not used and 6.34 g of butyl acrylate was used to prepare a butyl acrylate homopolymer. The prepared seed latex had a total solid content of 5% by weight, an average particle diameter of 90 nm, and a toluene-insoluble fraction of 92% by weight.

Comparative Example 4

An acrylic impact modifier powder was prepared in the same manner as in Example 1 except that, in the preparation of the core latex, rosin soap (potassium salt of rosin acid) was used in place of Trem LF-40.

Example 11

Preparation of Seed Latex

Seeds were prepared in the same manner as in Example 1.
(Preparation of Diene Cores)
Into a polymerization reactor (autoclave) purged with nitrogen, 200 g of ion-exchanged water, 20 g of the styrene-acrylonitrile seeds prepared as described above, 200 g of a 1,3-butadiene monomer, 0.4 g of emulsifier ASK, 0.2 g of a sodium salt of rosin acid, 0.5 g of sodium carbonate ($Na_2CO_3$) as an electrolyte, and 0.3 g of tert-dodecylmercaptan as a molecular weight-adjusting agent (TDDM), were added at the same time, and the temperature within the reactor was elevated to 55° C. Then, to the mixture, 0.3 g of sodium persulfate as a reaction initiator was added at a time, followed by reaction for 10 hours. 0.05 g of tert-dodecylmercaptan was added to the reaction mixture, followed by reaction at 65° C. for 8 hours. Then, the reaction was terminated.
The obtained rubber latex had a particle size of about 3000 and a toluene-insoluble fraction of about 85%.

(Preparation of Shell)
To 100 g (as solids) of the diene polymer latex prepared as described above, 90 g of deionized water, 0.5 g of HS-10, 15.8 g of styrene, 6.7 g of acrylonitrile, 0.3 g of tert-dodecylmercaptan, 0.05 g of sodium pyrophosphate, 0.08 g of dextrose, 0.003 g of ferrous sulfate, and 0.05 g of tert-butyl hydroperoxide (TBHP), were added at 45° C. at the same time. The mixture was allowed to react while elevating the reaction temperature to 70° C. over 60 minutes. Then, to the reaction solution, an emulsion containing 10 g of ion-exchanged water, 0.2 g of AZUARON HS-10, 15.8 g of styrene, 6.7 g of acrylonitrile, 0.3 g of tert-dodecylmercaptan, 0.05 g of sodium pyrophosphate, 0.08 g of dextrose, 0.003 g of ferrous sulfate and 0.1 g of cumene hydroperoxide (CHP) was added continuously over 60 minutes. Then, the mixture was elevated to 80° C., followed by standing at that temperature for one hour. Then, the reaction was terminated. After completion of the reaction, polymerization conversion was 98.9%.

Comparative Example 5

A diene impact modifier powder was prepared in the same manner as in Example 11 except that, in the preparation of the seed latex, styrene and acrylonitrile were not used and 6.34 g of butyl acrylate was used to prepare a butyl acrylate homopolymer.
(Preparation of Vinyl Chloride Resin)
100 parts by weight of polyvinyl chloride resin (polymerization degree=1000; LS-100 manufactured by LG Chem., Korea), 4.0 parts, based on the PVC, of a thermal stabilizer (DLP), 0.9 parts by weight of calcium stearate (Ca-St), 1.36 parts by weight of polyethylene wax (PE Wax), 1.0 part by weight of a processing aid (PA-821 manufactured by LG Chem.), 5.0 parts by weight of $CaCO_3$, and 4.0 parts by weight of $TiO_2$, were charged into a mixer at ambient temperature, and then stirred at 1000 rpm with heating to 115° C. As the mixture reached 115° C., the stirring speed of the mixture was lowered to 400 rpm. Then, the mixture was cooled to 40° C., thus preparing a master batch.
To the master batch, the impact modifier powder of each of Examples 1-11 and Comparative Examples 1-5 was added in an amount of 6 parts by weight based on the PVC, and then, milled using a two-roll mill at 190° C. for 7 minutes, thus preparing a 0.6-mm-thick sheet.
Each of these sheets was cut into a size of 150×200 mm, and laminated on a mold of 3×170×220 mm while maintaining a milling direction constant. Next, the laminated sheet was preheated with a heating press at 190° C. for 8 minutes under a pressure of 0.5 Kgf, compressed for 4 minutes under a pressure of 10 Kgf, and cooled for 3 minutes under a pressure of 10 Kgf, thus preparing a 3-mm-thick vinyl chloride resin sheet.
According to ASTM D-256 standard test methods, each of the sheets prepared as described above was cut with precision to make impact test samples which were then tested for Izod impact strength.
The characteristics and Izod impact strengths of the impact modifier powders prepared in Examples 1-11 and Comparative Examples 1-5 are shown in Table 1 below.

TABLE 1

| | Seed monomer | Core emulsifier | Rubber content (%) | Bulk density (g/cc) | Funnel flow (sec) | Compressibility (%) | Yellow index (YI) | Impact strength (kg · cm/cm) |
|---|---|---|---|---|---|---|---|---|
| Example 1 | ST + AN | Trem-LF40 | 91.35% | 0.53 | 12.4 | 17.0 | 23.0 | 125 |
| Example 2 | ST + AN | Trem-LF40 | | 0.50 | 13.3 | 16.6 | 24.3 | 130 |
| Example 3 | ST + AN | ASK | | 0.49 | 13.0 | 17.5 | 25.2 | 150 |

TABLE 1-continued

| | Seed monomer | Core emulsifier | Characteristics of impact modifier powders | | | | | |
|---|---|---|---|---|---|---|---|---|
| | | | Rubber content (%) | Bulk density (g/cc) | Funnel flow (sec) | Compressibility (%) | Yellow index (YI) | Impact strength (kg · cm/cm) |
| Example 4 | ST + AN | BC-10 | | 0.45 | 14.7 | 15.4 | 24.5 | 145 |
| Example 5 | ST + AN | H3626 A | | 0.48 | 15.0 | 14.9 | 25.3 | 124 |
| Example 6 | ST + AN | M12 | | 0.46 | 14.6 | 16.8 | 24.2 | 125 |
| Example 7 | ST + AN | M14 | | 0.45 | 14.9 | 17.2 | 24.8 | 127 |
| Example 8 | ST + AN | SLS | | 0.50 | 13.8 | 15.8 | 25.0 | 148 |
| Example 9 | ST + BA | Trem-LF40 | | 0.47 | 15.8 | 16.1 | 24.3 | 115 |
| Example 10 | ST + BA | Trem-LF40 | | 0.46 | 16.3 | 18.0 | 24.5 | 109 |
| Comp. Ex. 1 | ST | Trem-LF40 | | 0.48 | 28.5 | 24.5 | 28.5 | 58 |
| Comp. Ex. 2 | MMA | Trem-LF40 | | 0.49 | 27.2 | 23.8 | 27.5 | 70 |
| Comp. Ex. 3 | BA | Trem-LF40 | | 0.47 | 31.0 | 28.1 | 28.1 | 85 |
| Comp. Ex. 4 | ST + AN | R/soap | | 0.45 | 26.4 | 30.4 | 28.7 | 40 |
| Example 11 | ST + AN | ASK | 70% | 0.50 | 16.0 | 20.1 | 23.1 | 130 |
| Comp. Ex. 5 | BA | ASK | | 0.42 | 38.0 | 28.1 | 27.1 | 82 |

As can be seen in Table 1 above, Examples 1-11 all showed an excellent funnel flow property shorter than 20 seconds whereas Comparative Examples 1-5 all showed a funnel flow property longer than 20 seconds. Moreover, in the compressibility, Examples 1-11 all were less than 18% whereas Comparative Examples 1-4 were very high. Also in the yellow index, Examples 1-11 were superior to Comparative Examples 1-5. In the Izod impact strength, Examples 1-11 were similar or superior to the impact modifier powders prepared by the coagulation process.

INDUSTRIAL APPLICABILITY

The polymer latex according to the present invention has high rubber content leading to excellent impact resistance, and at the same time, low viscosity leading to excellent long-term workability upon spray drying, and excellent mechanical stability. The powders prepared by spray drying of the polymer latex are excellent in not only impact resistance but also flow properties.

What is claimed is:

1. A multilayer polymer latex comprising:
   a seed;
   a rubbery core surrounding the seed; and
   a shell surrounding the rubbery core,
   wherein the seed comprises a copolymer of a vinyl monomer and a hydrophilic monomer, the copolymer containing: i) 65-99.0 parts by weight of a vinyl unit, ii) 0.5-30 parts by weight of a hydrophilic unit, and iii) 0.5-5 parts by weight of a crosslinker unit, the parts by weight being based on the sum of the seed units taken as 100 parts by weight,
   wherein the rubbery core surrounding the seed comprises:
   i) 97.0-99.9 parts by weight of alkyl acrylate where the alkyl group contains 1 to 8 carbon atoms, and ii) 0.1-3.0 parts by weight of a crosslinker unit, the parts by weight being based on the sum of the core units taken as 100 parts by weight,
   wherein the shell surrounding the rubbery core comprises at least one unit selected from an alkyl methacrylate unit where the alkyl group contains 1 to 4 carbon atoms, and an aromatic vinyl unit, and
   wherein the seed is present at an amount of 0.3-10 parts by weight, the rubbery core at 89.7-94.7 parts by weight, and the shell at 0.3-10 parts by weight, the parts by weight being based on the sum of the polymer latex units taken as 100 parts by weight.

2. The polymer latex of claim 1, which has a rubber content of more than 90% by weight and a viscosity of less than 1,000 cps.

3. The polymer latex of claim 1, wherein the crosslinker unit iii) of the seed is derived from at least one monomer selected from the group consisting of divinylbenzene, 1,3-butanediol diacrylate, 1,3-butanediol dimethacrylate, 1,4-butanediol diacrylate, 1,4-butanediol dimethacrylate, allyl acrylate, allyl methacrylate, trimethylolpropropane triacrylate, tetraethyleneglycol diacrylate, and tetraethyleneglycol dimethacrylate.

4. The polymer latex of claim 1, wherein the alkyl acrylate i) of the core is at least one selected from the group of methyl acrylate, ethyl acrylate, propyl acrylate, isopropyl acrylate, butyl acrylate, hexyl acrylate, octyl acrylate, and 2-ethylhexyl acrylate, and the crosslinker unit ii) of the core is derived from at least one monomer selected from the group consisting of 1,3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethyleneglycol diacrylate, tetraethyleneglycol dimethacrylate and divinylbenzene.

5. The polymer latex of claim 1, wherein the at least one unit of the shell is derived from a monomer selected from the group consisting of methyl methacrylate, ethyl methacrylate, butyl methacrylate, and styrene.

6. Polymer powder obtained by spray-drying a polymer latex as claimed in claim 1.

7. A resin composition containing the polymer powder of claim 6 as an impact modifier.

8. The resin composition of claim 7, wherein the polymer powder is contained in the resin composition at an amount of 1-20% by weight.

9. The resin composition of claim 7, wherein the resin is vinyl chloride resin.

10. The resin composition of claim 1, wherein the vinyl unit i) of the seed is derived from at least one monomer selected from the group consisting of styrene, α-methyl styrene, vinyl toluene and 3,4-dichlorostyrene, and the hydrophilic unit ii) of the seed is derived from at least one monomer selected from the group consisting of acrylonitrile, alkyl methacrylate, alkyl acrylate, hydroxylmethyl methacrylate and glycidyl methacrylate.

11. The polymer latex of claim 1, wherein the seed is present at an amount of 0.3-0.8 parts by weight based on the sum of the polymer latex units taken as 100 parts by weight and monomers of the seed comprise a mixture of styrene, acrylonitrile and ethyleneglycol dimethacrylate.

12. A multilayer polymer latex comprising:
a seed;
a rubbery core surrounding the seed; and
a shell surrounding the rubbery core,
wherein the seed comprises a copolymer of a vinyl monomer and a hydrophilic monomer, the copolymer containing: i) 65-99.0 parts by weight of a vinyl unit, ii) 0.5-30 parts by weight of a hydrophilic unit, and iii) 0.5-5 parts by weight of a crosslinker unit, the parts by weight being based on the sum of the seed units taken as 100 parts by weight, and monomers of the seed comprise a mixture of styrene, acrylonitrile and ethyleneglycol dimethacrylate,
wherein the rubbery core surrounding the seed comprises a diene unit, and the shell surrounding the rubber core comprises at least one unit selected from the group consisting of an aromatic vinyl unit and an acrylate unit,
wherein the seed is present at an amount of 0.3-0.8 parts by weight, the rubbery core at 40-70 parts by weight, and the shell at 20-59.7 parts by weight, the parts by weight being based on the sum of the polymer latex units taken as 100 parts by weight, and
wherein the polymer latex has a rubber content of more than 40% by weight and a viscosity of less than 1,000 cps.

13. The polymer latex of claim 12, wherein the diene unit of the core is derived from at least one monomer selected from the group consisting of 1,3-butadiene, and isoprene.

14. The polymer latex of claim 12, wherein the at least one unit of the shell is derived from a monomer selected from the group consisting of styrene, acrylonitrile, α-methylstyrene, methyl methacrylate, ethyl acrylate, butyl acrylate, methacrylic acid, and acrylic acid.

15. The polymer latex of claim 1 or claim 12, wherein the seed has a toluene-insoluble fraction of 50-99.9% by weight.

16. The polymer of claim 1 or claim 12, which has a particle size of 200-1000 nm.

17. The polymer latex of claim 1 or claim 12, wherein the polymer latex is in the form of powder.

18. The polymer latex of claim 1 or claim 12, wherein the seed is present at an amount of 0.3-0.79 parts by weight based on the sum of the polymer latex units taken as 100 parts by weight and monomers of the seed comprise a mixture of styrene, acrylonitrile and ethyleneglycol dimethacrylate.

* * * * *